Oct. 9, 1951     A. S. VOLPIN     2,570,413
AUTOMATIC SEALING GATE VALVE
Filed Sept. 8, 1945     3 Sheets-Sheet 1

A. S. VOLPIN
INVENTOR.

BY Lester B. Clark
    Ray L. Smith
        ATTORNEYS

A. S. VOLPIN
INVENTOR.

BY Lester B. Clark
  Ray L. Smith
  ATTORNEYS

UNITED STATES PATENT OFFICE 2,570,413

AUTOMATIC SEALING GATE VALVE

Alexander S. Volpin, Houston, Tex.

Application September 8, 1945, Serial No. 615,128

4 Claims. (Cl. 251—167.1)

The invention relates to a lubricated gate valve wherein the lubricant or sealing material will be fed into the distribution grooves automatically by the line pressure upon the valve.

It is one of the objects of the invention to provide a two-part gate valve wherein the parts are resiliently urged against the seating surfaces and where a sealing material is automatically maintained in the distribution grooves about the ports being sealed.

Another object of the invention is to provide a combination seat and sealing material distribution member for insertion in a gate valve body.

Still another object of the invention is to provide a seat member for gate valves which cooperates with a valve housing to provide a reservoir for sealing material.

Still another object of the invention is to provide a gate valve wherein sealing material is forced into the distribution grooves from a reservoir by the line pressure applied to the valve.

Still another object of the invention is to provide a gate valve wherein replaceable seat members are arranged to guide the valve from a seat therefor, cooperate with the valve body in forming a sealing material reservoir, and to also distribute the sealing material to the gate member faces.

Still another object of the invention is to provide a seat member for gate valves which serves as a seat for the gate member and provides a combination reservoir for sealing material and also automatically seals itself with the valve body.

Other and further objects of the invention will be readily apparent when the following description is considered in connection with the accompanying drawings, wherein.

Figure 1:
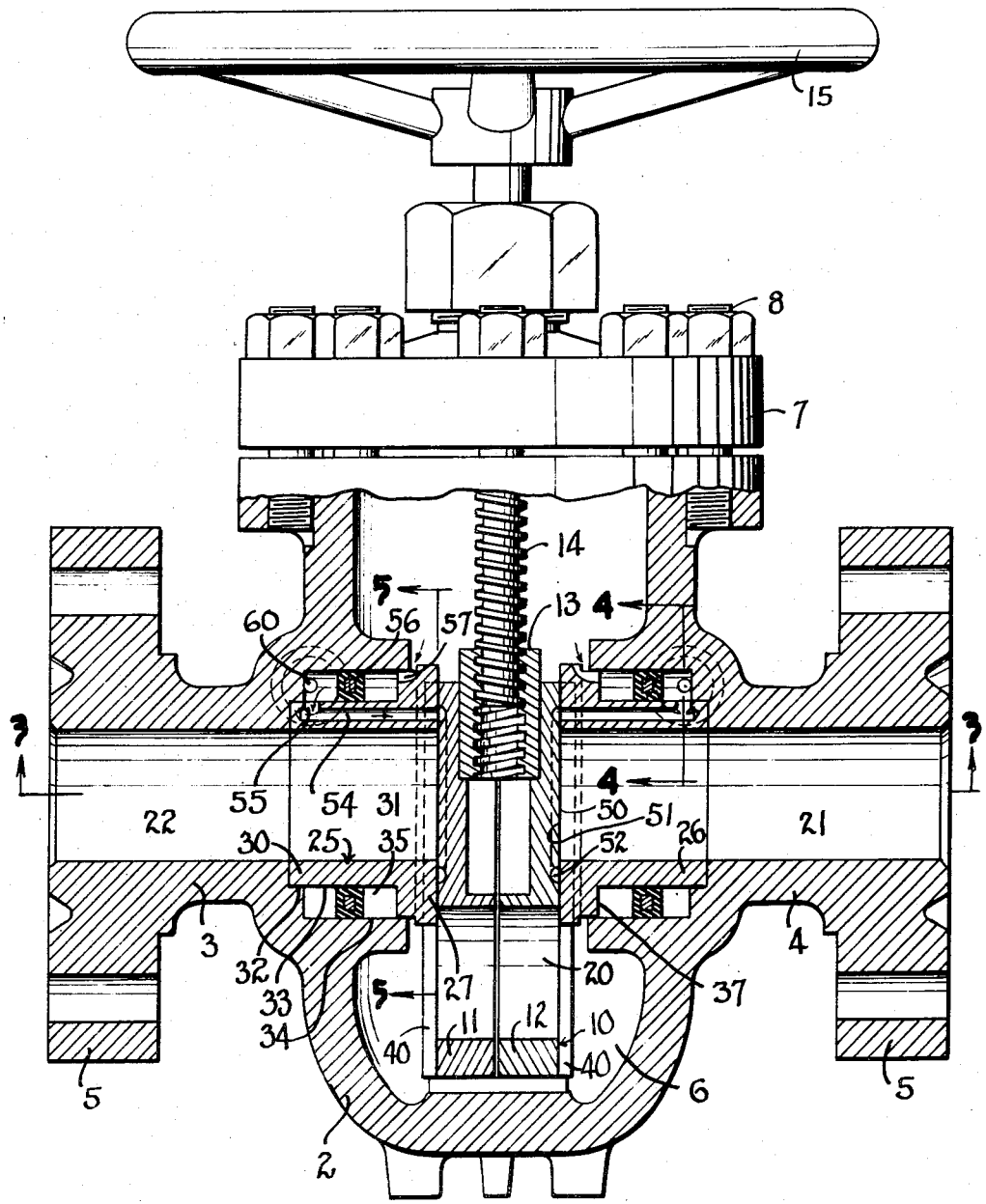
Fig. 1 is a vertical sectional view of a valve embodying the invention and illustrating the gate member in closed position.
Figure 3:
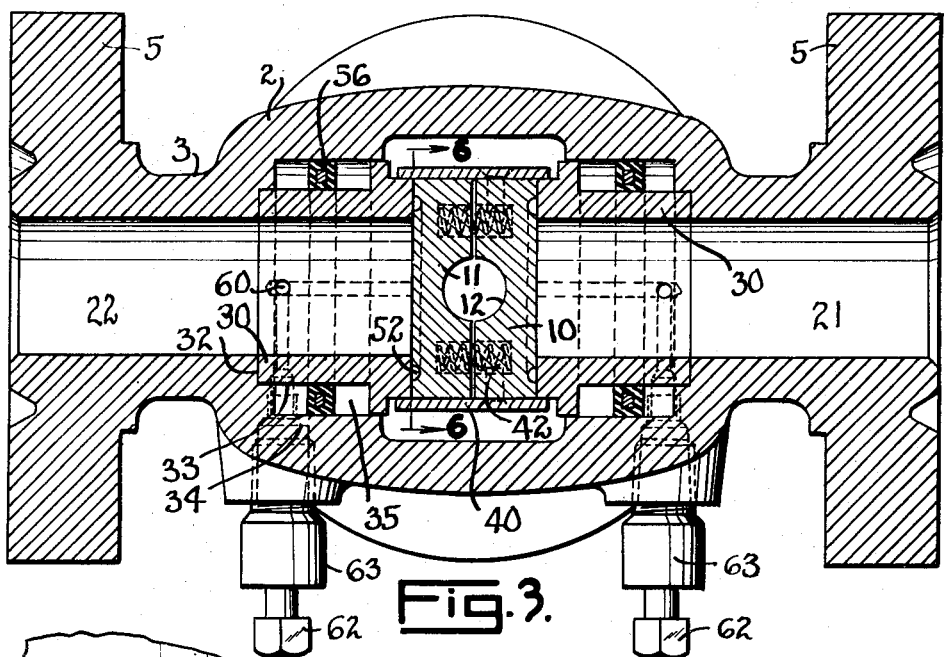
Figure 4:
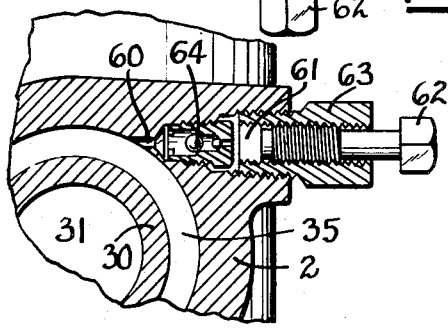
Figure 5:
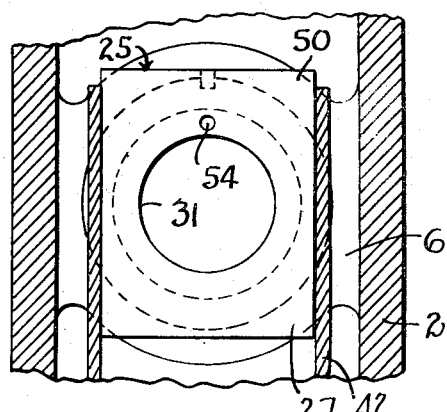

Figs. 3, 4, and 5 are sections taken on the line 3—3, 4—4, and 5—5 respectively of Fig. 1.

Figure 6:
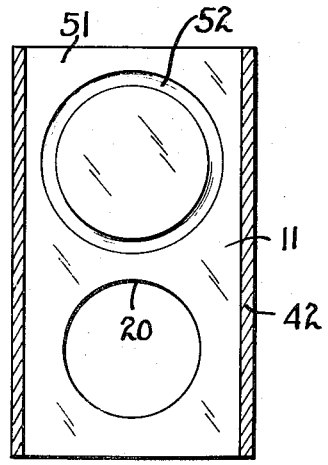

Fig. 6 is a section taken on the line 6—6 of Fig. 3.

Figure 2:
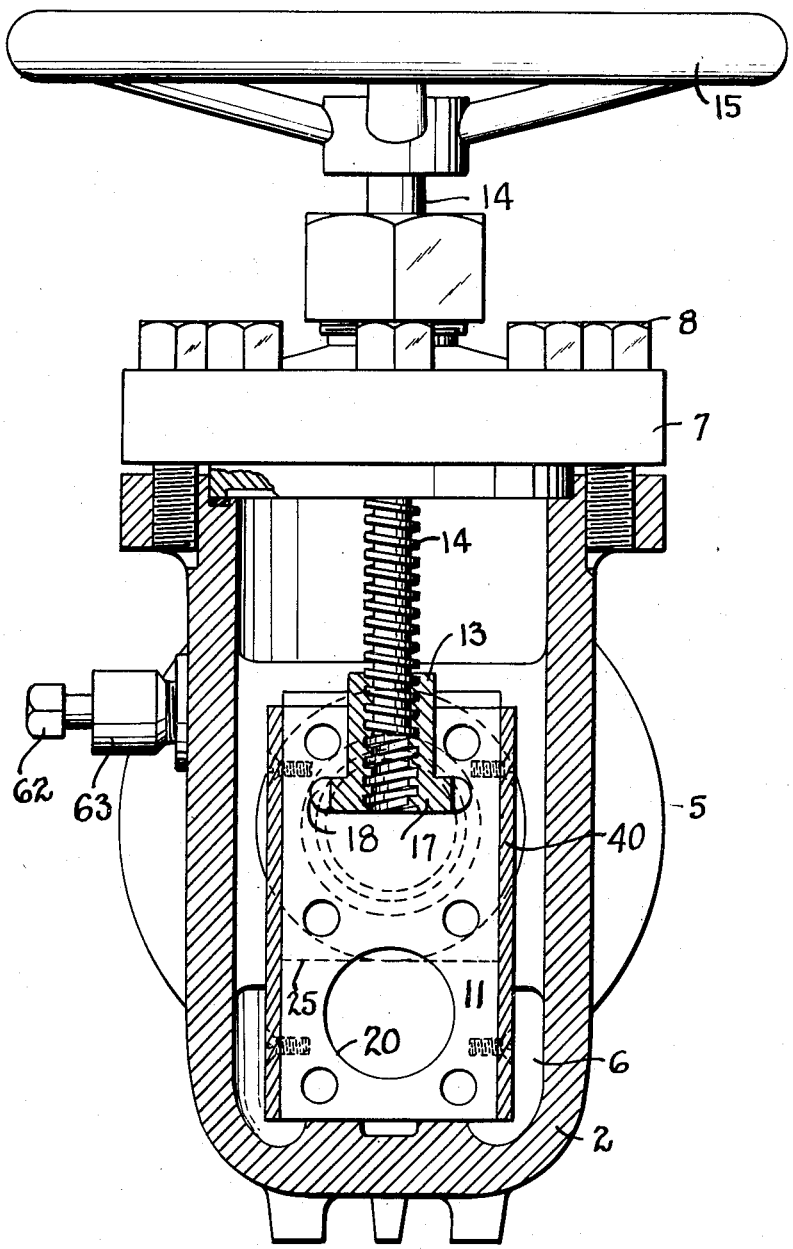
Fig. 2 is a central vertical sectional view taken at right angles to the view of Fig. 1.

In Fig. 1 the valve body 2 is provided with the extensions 3 and 4 which carry the flanges 5 by which the valve is connected in the pipe line where the flow is to be controlled. The body 2 is provided with a valve chamber 6 which is closed by the cap or bonnet 7 held in position by the nuts and bolts 8. The gate member 10 is made up of the segments 11 and 12 which are arranged to be positioned about a bushing 13 threaded on a stem 14 which may be turned by a hand wheel 15. This bushing 13 as seen in Fig. 2 is enlarged at 17 to be received in the recesses 18 in the segments 11 and 12 so that vertical traveling movement of the bushing on the stem causes the segments of the gate member to move vertically in the chamber 6.

The segments each have the passage 20 therein which are arranged for alignment with the flow passages 21 and 22 extending in opposite directions in the housing.

In order to provide a seat and seal for the segments 11 and 12 as regards the flow passages, the seat members 25 and 26 have been provided. These seat members are in the form of a body 27 having a cylindrical extension 30 thereon projecting laterally therefrom. The extension 30 has a passage 31 therein which is arranged to be in alignment with the passage 22. The extension 30 is arranged to fit into the cylindrical recess 32 formed in the body of the housing and may be threaded into such recess if desired.

The periphery 33 of the extension is of less diameter than the bore 34 extending from the gate chamber 6 into the body so as to provide a space or reservoir 35 between the extension and the valve body. The end of this chamber is closed by the enlarged portion 37 of the body 27 so that an annular reservoir 35 is thus provided.

The side plates 40 as best seen in Fig. 3 are disposed at the edges of the segments 11 and 12 and abut against the sides of the body 27 so as to confine the segments and direct their vertical movement. The segments 11 and 12 are normally urged apart by the steel springs 42 disposed in pockets in the two segments.

The seat members 25 are provided with a forward face 50 which is arranged to engage the face 51 of the segments 11 and 12 so as to close the passage 31 through the valve member.

In order to main a seal about the passage 31, the face 51 of the segments is provided with an annular distribution groove 52 which is arranged to receive sealing material from the conduit 54 disposed in the extension 30 of the seat member 35. This conduit in turn is connected at 55 with the annular reservoir 35 so that sealing material in the reservoir may be forced into the distribution groove 52. A barrier in the form of an annular ring 56 is slidable in the reservoir 35 due to pressure entering the reservoir through the vent passage 57 from the gate chamber 6. This pressure tends to force the barrier along the reservoir 35 and any sealing material in the reservoir will thus be compelled to move into the conduit 54 and the distribution groove 52. It seems obvious that line pressure from the high pressure side will leak into the gate chamber 6 and will thus be available to force the sealing material into the distribution groove 52 on the lower pressure side.

The reservoir 35 can be refilled by forcing sealing material through the opening 60, best seen in Fig. 4 where the sealing material will be positioned in a chamber 61 and forced inwardly by the pressure spindle 62 threaded into the fitting 63. The check valve 64 prevents the return flow of sealing material. As the reservoir is filled, the barrier 56 will of course be forced backwardly in the reservoir against any line pressure that may be present.

While the reservoir seat and various parts have been described as applied to one side of the gate valve, the drawings illustrate an identical arrangement of the other portion on the opposite side of the gate member so that the valve may be used as a two-way valve and the high pressure applied at either side thereof.

It seems obvious that a simple and economical construction has been arranged whereby the seat members can be readily replaced and sealing material provided for long periods of service.

What is claimed is:

1. A lubricated gate valve including a housing, a gate chamber therein, a gate, means to move said gate, a flow passage intercepting said chamber, an annular enlargement in said passage, a gate seat secured therein, said seat having an annular extension whose diameter is substantially less than that of said enlargement to provide an annular space therebetween, a vent from said chamber to said annular space, a movable barrier about said extension in said annular space, a side of said barrier being exposed to line pressure passing into said space through said vent, the length of said annular space being substantially greater than the width of said barrier to provide a lubricant reservoir in said space on the opposite side of said movable barrier, means to introduce lubricant into said reservoir, and means to conduct lubricant from said reservoir through said extension to said seat, said barrier being movable to force lubricant from said reservoir to said seat solely in response to chamber pressure entering said vent.

2. A lubricated gate valve including a housing, a gate chamber therein, a gate, means to move said gate, a flow passage intercepting said chamber, an annular enlargement in said passage, a gate seat secured therein, said seat having an annular extension whose diameter is substantially less than that of said enlargement to provide an annular space therebetween, a vent from said chamber to said annular space, a movable barrier about said extension in said annular space, a side of said barrier being exposed to line pressure passing into said space through said vent, the length of said annular space being substantially greater than the width of said barrier to provide a lubricant reservoir in said space on the opposite side of said movable barrier, means to introduce lubricant into said reservoir, and means to conduct lubricant from said reservoir through said extension to said seat, said barrier being movable to force lubricant from said reservoir to said seat solely in response to chamber pressure entering said vent, said gate comprising a two part gate whose parts are resiliently urged apart.

3. A lubricated gate valve including a housing, a gate chamber therein, a gate, means to move said gate, a flow passage intercepting said chamber, an annular enlargement in said passage, a gate seat secured therein, said seat having an annular extension whose diameter is substantially less than that of said enlargement to provide an annular space therebetween, a vent from said chamber to said annular space, a movable barrier about said extension in said annular space, a side of said barrier being exposed to line pressure passing into said space through said vent, the length of said annular space being substantially greater than the width of said barrier to provide a lubricant reservoir in said space on the opposite side of said movable barrier, means to introduce lubricant into said reservoir, and means to conduct lubricant from said reservoir through said extension to said seat, said barrier being movable to force lubricant from said reservoir to said seat solely in response to chamber pressure entering said vent, said gate having a full part groove therein about the flow passage to receive the lubricant from said conduit.

4. A lubricated gate valve including a housing, a gate chamber therein, a gate, said gate having a groove means to move said gate, a flow passage intercepting said chamber, an annular enlargement in said passage, a gate seat secured therein, said seat having an annular extension whose diameter is substantially less than that of said enlargement to provide an annular space therebetween, a vent from said chamber to said annular space, a movable barrier about said extension in said annular space, a side of said barrier being exposed to line pressure passing into said space through said vent, the length of said annular space being substantially greater than the width of said barrier to provide a lubricant reservoir in said space on the opposite side of said movable barrier, means to introduce lubricant into said reservoir, and means to conduct lubricant from said reservoir through said extension to said seat and gate groove, said barrier being movable to force lubricant from said reservoir to said seat solely in response to chamber pressure entering said vent, said groove moving away to disconnect from said conduit and reservoir when said gate moves to open position.

ALEXANDER S. VOLPIN.

REFERENCES CITED

The following references are of record in the file of this patent:

UNITED STATES PATENTS

| Number | Name | Date |
| --- | --- | --- |
| 1,980,768 | Specht | Nov. 13, 1934 |
| 2,006,715 | McCausland | July 2, 1935 |
| 2,030,458 | McKellar | Feb. 11, 1936 |
| 2,269,887 | Sharp | Jan. 13, 1942 |
| 2,317,657 | Volpin | Apr. 27, 1943 |